US007268642B2

(12) United States Patent
Yarbrough, III et al.

(10) Patent No.: US 7,268,642 B2
(45) Date of Patent: Sep. 11, 2007

(54) UNIVERSAL SWITCH

(75) Inventors: Charles T. Yarbrough, III, Austin, TX (US); James A. Reimund, Georgetown, TX (US); Michel G. Haddad, Austin, TX (US); Rajesh Sukumaran, Austin, TX (US)

(73) Assignee: National Instruments Corporation, Austin, TX (US)

( * ) Notice: Subject to any disclaimer, the term of this patent is extended or adjusted under 35 U.S.C. 154(b) by 411 days.

(21) Appl. No.: 10/851,679

(22) Filed: May 21, 2004

(65) Prior Publication Data

US 2005/0259491 A1 Nov. 24, 2005

(51) Int. Cl.
*H01P 1/10* (2006.01)
*H01H 57/00* (2006.01)

(52) U.S. Cl. ...................................... 333/101; 200/181

(58) Field of Classification Search ................ 333/101, 333/103, 105, 262; 200/181; 335/78
See application file for complete search history.

(56) References Cited

U.S. PATENT DOCUMENTS 4,438,415 A * 3/1984 Hopfer ..................... 333/81 A
4,482,818 A 11/1984 Ryczek et al. ............. 327/49.6
4,827,096 A 5/1989 Martinetti ................... 200/275
5,347,239 A * 9/1994 Loehner et al. ........... 333/81 R
6,457,641 B1 10/2002 Reichardt ................... 235/441
6,671,496 B1 * 12/2003 Hoshi .......................... 455/78
2005/0270137 A1 12/2005 Yarbrough III, et al. ... 340/2.28

* cited by examiner

*Primary Examiner*—Dean Takaoka
(74) *Attorney, Agent, or Firm*—Meyertons Hood Kivlin Kowert & Goetzel, P.C.; Jeffrey C. Hood

(57) ABSTRACT

A dimensionally flexible sparse matrix comprising multiple ports connected to a plurality of interconnected universal switches is disclosed. Each universal switch has at least three terminals and is switchable to connect any pair or all three terminals together. The plurality of interconnected universal switches are independently switchable to connect any one or more ports of the sparse matrix to any subset of the others ports. The sparse matrix may also be cofigurable to duplicate the connectivity of a variety of dimensionally different switch matrices by designating a first subset of the multiple ports as row ports and a second subset of the remaining ports as column ports with the added flexibilty of connecting row-to-row and/or column-to column. The small physical size of signals stubs in the univerals switches results in a signal path between any pair of terminals that may be suitable for the transmission of signal frequencies greater than approximately 500 mega-hertz.

24 Claims, 11 Drawing Sheets

UNIVERSAL SWITCH

BACKGROUND OF THE INVENTION

1. Field of the Invention

This invention relates generally to the field of switch matrices and, more particularly, to radio frequency (RF) switch matrices.

2. Description of the Related Art

In the processes involved in product development, product testing, or research experiments, there is often a need to connect one or more instruments to one or more RF signals. Each of a plurality of independent signals may need to be connected to one or more instruments. Such connections, involving one or more sets with each set including one or more independent instruments and one or more independent signals, may be accomplished using a traditional switch matrix. A switch matrix allows row terminals to connect to column terminals. A full matrix topology has a switch or relay at every row-column crosspoint. FIG. 1 illustrates this topology with one single pole, single throw (SPST) switch at every row-column crosspoint (note: row 0 is connected to column 1 and row 2 is connected to column 3 in FIG. 1). While this topology allows as many simultaneous routes as the smaller of the number of rows or the number of columns, it is expensive to provide a switch or relay for every crosspoint. A column-to-column connection is not possible without simultaneously energizing a row. Similarly, a row-to-row connection is not possible without simultaneously energizing a column.

In addition, as shown in FIG. 2, a full switch matrix is not ideal for carrying high frequency signals, because the unused portion of the connected traces (shown as a dashed line) adds capacitive load and Signal stubs to the transmission lines. This results in reflections that can distort and attenuate the signal. These reflections can vary from one crosspoint position to another due to Signal stubs of varying length. FIG. 3 shows a full blocking matrix that trims any excess stubs from the connected row and column. However, this topology does not allow row-to-row or column-to-column connectivity, nor does it allow a column to connect to more than one row or a row to connect to more than one column.

An alternative to a full matrix is a sparse matrix. This topology allows only a limited number of simultaneous row-to-column connections—often only one connection at a time. Sparse matrices are generally made from two multiplexers with their common ports tied together, as shown in FIG. 4 (note: row 1 is connected to column 3 in FIG. 4). Sparse matrices use fewer relays and are less expensive than full matrices. A typical sparse matrix can make a single, stub-free connection between one column port and one row port.

More complicated signal routing connection pathways would benefit from a switch matrix with more versatile connection options than provided by a traditional switch matrix. It would be advantageous to be able to connect any subset of the switch matrix ports to any other subset of the remaining ports. High frequency signal applications would also benefit from a switch matrix with improved high frequency signal routing and transmission characteristics.

SUMMARY

A system is disclosed for a universal switch that may be used in a switch matrix to provide more versatile interconnections between rows, between columns, and between rows and columns. In one set of embodiments, the universal switch comprises three terminals and a plurality of interconnected switches coupled to the terminals. Each of the interconnected switches is independently switchable.

The plurality of interconnected switches may be configurable to implement a variety of different interconnections between the three terminals. In some embodiments, the plurality of interconnected switches may be configurable to implement any of a specific set of interconnections between the terminals including: the first terminal T1 connected only to the second terminal T2, the first terminal T1 connected only to the third terminal T3, or the second terminal T2 connected only to the third terminal T3. In other embodiments, the plurality of interconnected switches may also be configurable to implement connecting all terminals together. In still other embodiments, the plurality of interconnected switches may also be configurable to disconnect the three terminals.

The plurality of interconnected switches coupled to the terminals includes embodiments with 2, 3, and 4 switches. Other embodiments with more switches are also possible and contemplated.

In another set of embodiments, the universal switch may be a multi-terminal universal switch, comprising N terminals, where N is an integer greater than 2; and a plurality of interconnected switches, coupled to the terminals, where each switch is independently switchable, and where the plurality of interconnected switches may be configurable to implement any two of the terminals connected. In some of these embodiments, the plurality of interconnected switches may also be configurable to implement any subset of the terminals connected to any other subset of the terminals. In still others of these embodiments, the plurality of interconnected switches may also be configurable to implement all terminals disconnected.

BRIEF DESCRIPTION OF THE DRAWINGS

A better understanding of the present invention can be obtained when the following detailed description is considered in conjunction with the following drawings, in which.

Figure 1:
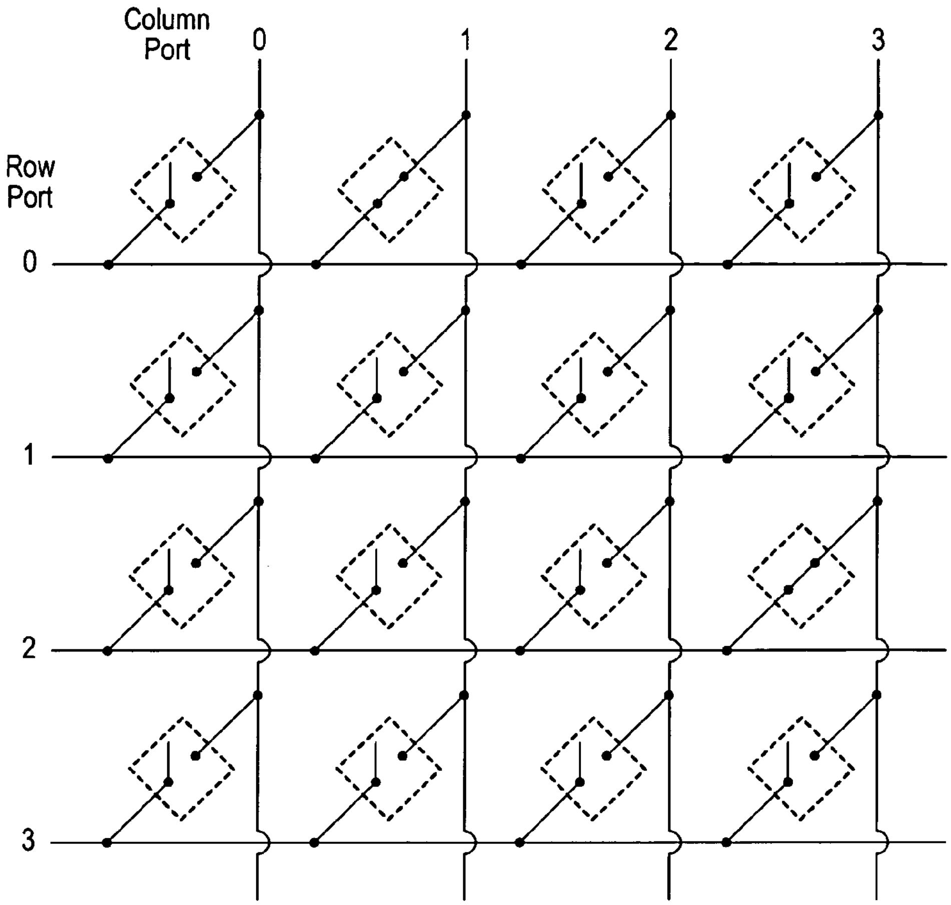
FIG. 1 illustrates a traditional switch matrix with a single pole, single throw switch at each crosspoint of the matrix, according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIGS. 5*a* through 8 illustrate several embodiments of a versatile universal switch that may be used in a switch matrix to provide a variety of different interconnections between rows, between columns, and between rows and columns.

In some embodiments, the universal switch may be a multi-terminal universal switch comprising: N terminals (where N is an integer greater than 2) and a plurality of interconnected switches coupled to the terminals. Each switch may be independently switchable, and the plurality of interconnected switches may be configurable to implement one or more of: any two of the terminals connected, any three of the terminals connected, all terminals connected, any subset of the terminals connected to any other subset of the terminals, and all terminals disconnected.

Three Terminal Universal Switch

Each of the universal switch embodiments 100, 105, 110, 120, or 130 shown in FIGS. 5*a* through 8 is referred to herein as a three terminal universal switch. A three terminal universal switch comprises a first terminal T1, a second terminal T2, and a third terminal T3, and a plurality of interconnected switches coupled to the terminals. Each of the interconnected switches may be independently switchable. The plurality of interconnected switches may be configurable to implement a variety of interconnections between the terminals. In one set of embodiments, the plurality of interconnected switches may be configurable to implement any of a set of interconnections between the terminals including: the first terminal T1 connected only to the second terminal T2, the first terminal T1 connected only to the third terminal T3, or the second terminal T2 connected only to the third terminal T3. The plurality of interconnected switches may also be configurable to implement the first terminal T1 connected to the second terminal T2 and the third terminal T3, and in some of the embodiments, the plurality of interconnected switches may also be configurable to disconnect the three terminals.

In some of the embodiments, the plurality of interconnected switches may include single pole, double throw (SPDT) or single pole, single throw (SPST) relays. In these embodiments, the universal switch further comprises a coil in each relay connected to a corresponding pair of external coil terminals. An electric current may be applied to a selected pair of coil terminals to switch the corresponding relay.

In some embodiments, the plurality of interconnected switches may comprise one or more other switch types, e.g., electro-mechanical switches, mechanical switches, and solid-state switches, among others.

Two Interconnected Switches

FIGS. 5*a* through 5*e* illustrate various configurations of a three terminal universal switch with two interconnected switches S1 and S2, and also indicate the signal path and Signal stubs for each configuration. More specifically, FIGS. 5*a-d* illustrate various switching states of an embodiment of a three terminal universal switch with two interconnected single pole, double throw switches S1 and S2. Each of the two interconnected switches comprises a first pin 10, a second pin 20, and a third pin 30. The first pin 10*a* of the first switch S1 is connected to the first terminal T1, the first pin 10*b* of the second switch S2 is connected to the second terminal T2, the second pin 20*a* of the first switch S1 is connected to the second pin 20*b* of the second switch S2, and the third pin 30*a* of the first switch S1 is commonly connected to the third pin 30*b* of the second switch S2 and the third terminal T3. Each of the two interconnected switches may be independently switchable to implement the first pin 10 connected to the second pin 20 or the first pin 10 connected to the third pin 30.

Figure 5A:
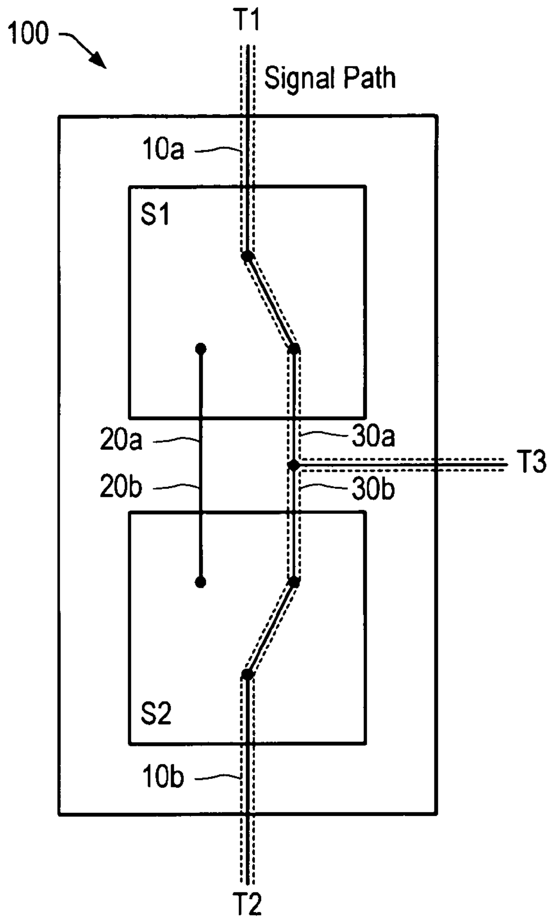
FIG. 5*a* illustrates one embodiment of a three terminal universal switch comprising 2 interconnected switches in a state with all terminals connected.
Figure 5B:
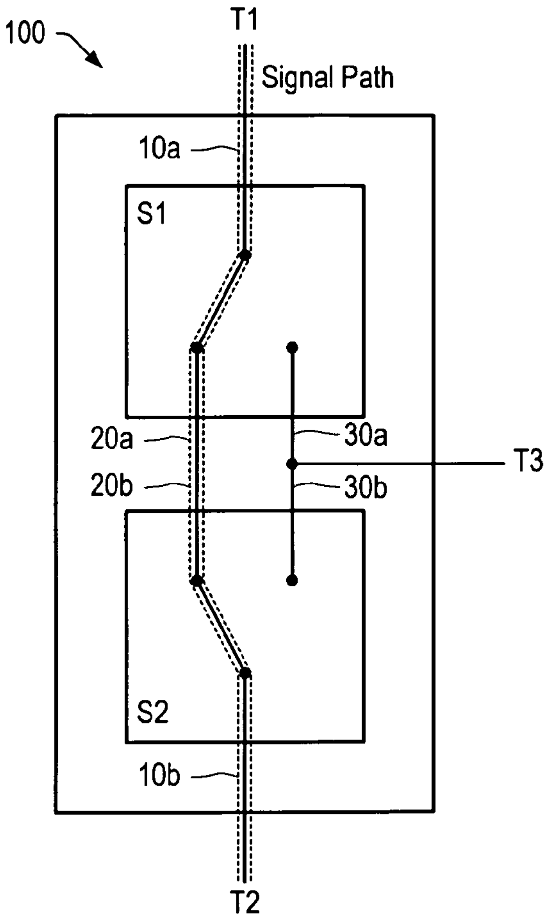
FIG. 5*b* illustrates one embodiment of a three terminal universal switch comprising 2 interconnected switches in a state with only terminal 1 and terminal 2 connected.
Figure 5C:
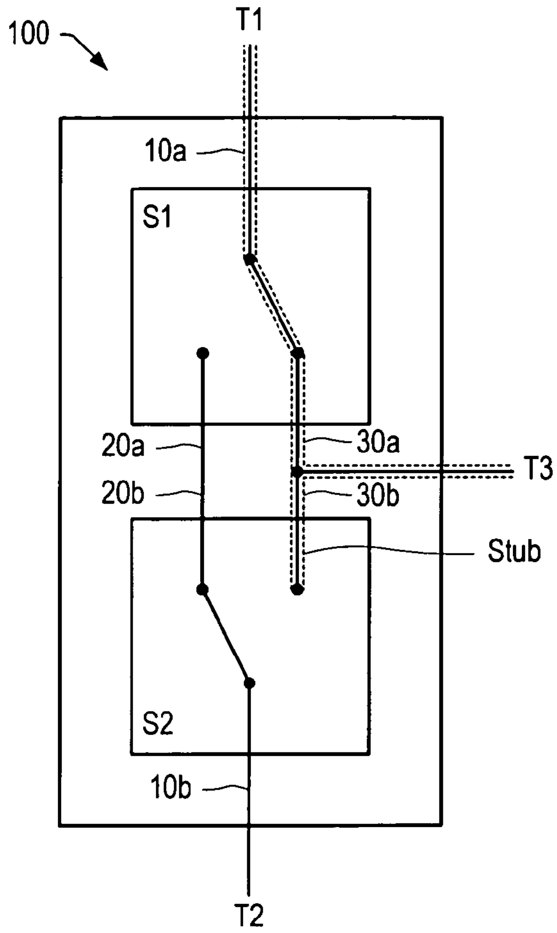
FIG. 5*c* illustrates one embodiment of a three terminal universal switch comprising 2 interconnected switches in a state with only terminal 1 and terminal 3 connected.
Figure 5D:
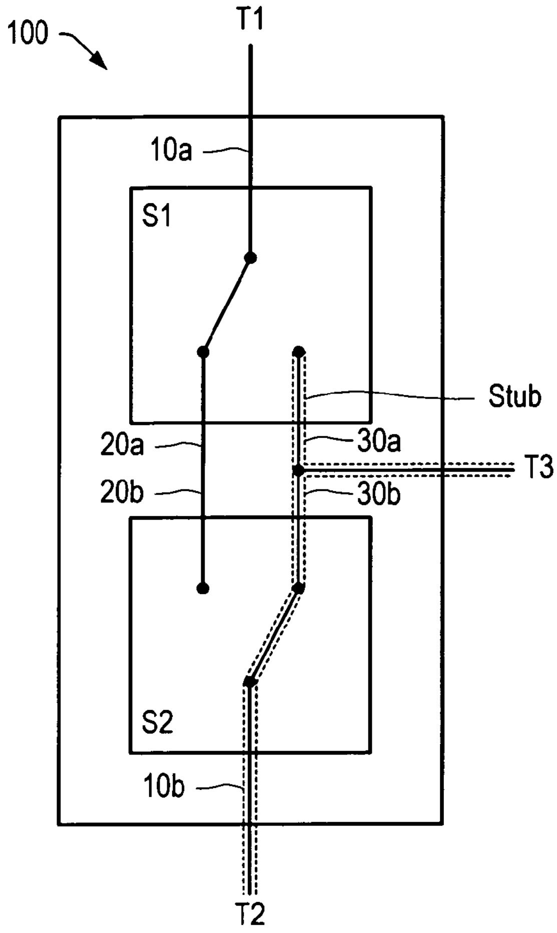
FIG. 5*d* illustrates one embodiment of a three terminal universal switch comprising 2 interconnected switches in a state with only terminal 2 and terminal 3 connected.
Figure 5E:
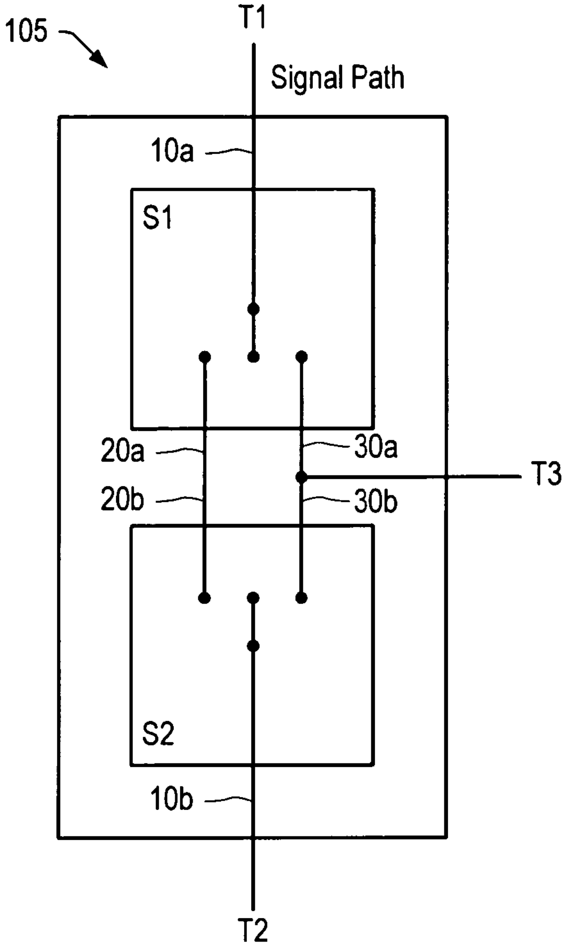
FIG. 5*e* illustrates one embodiment of a three terminal universal switch comprising 2 interconnected switches in a state with all terminals disconnected.

FIG. 5*e* illustrates another embodiment of a three terminal universal switch 105 with two interconnected single pole, double throw switches S1 and S2, each with a disconnect state. In this embodiment, the first switch S1 and the second switch S2 may be further switchable to disconnect the first pin 10 from both the second pin 20 and the third pin 30, and therefore the first switch S1 and the second switch S2 may disconnect the first terminal T1, the second terminal T2, and the third terminal T3 from each other. In other words, FIG. 5*e* illustrates the switchable state of all terminals disconnected. Other embodiments achieving this function include using single pole, triple throw switches for S1 and S2, or connecting a single pole, single throw switch to the first pin 10 of both S1 and S2.

In still another embodiment either switch S1 or switch S2 may be replaced with two SPST switches.

Figure 2:
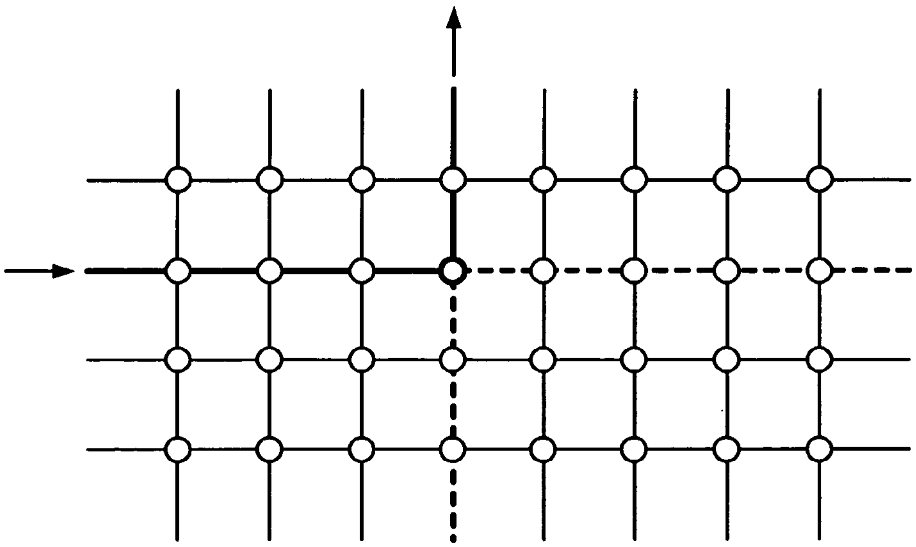
FIG. 2 illustrates a traditional switch matrix with Signal stubs, according to the prior art.
Figure 3:
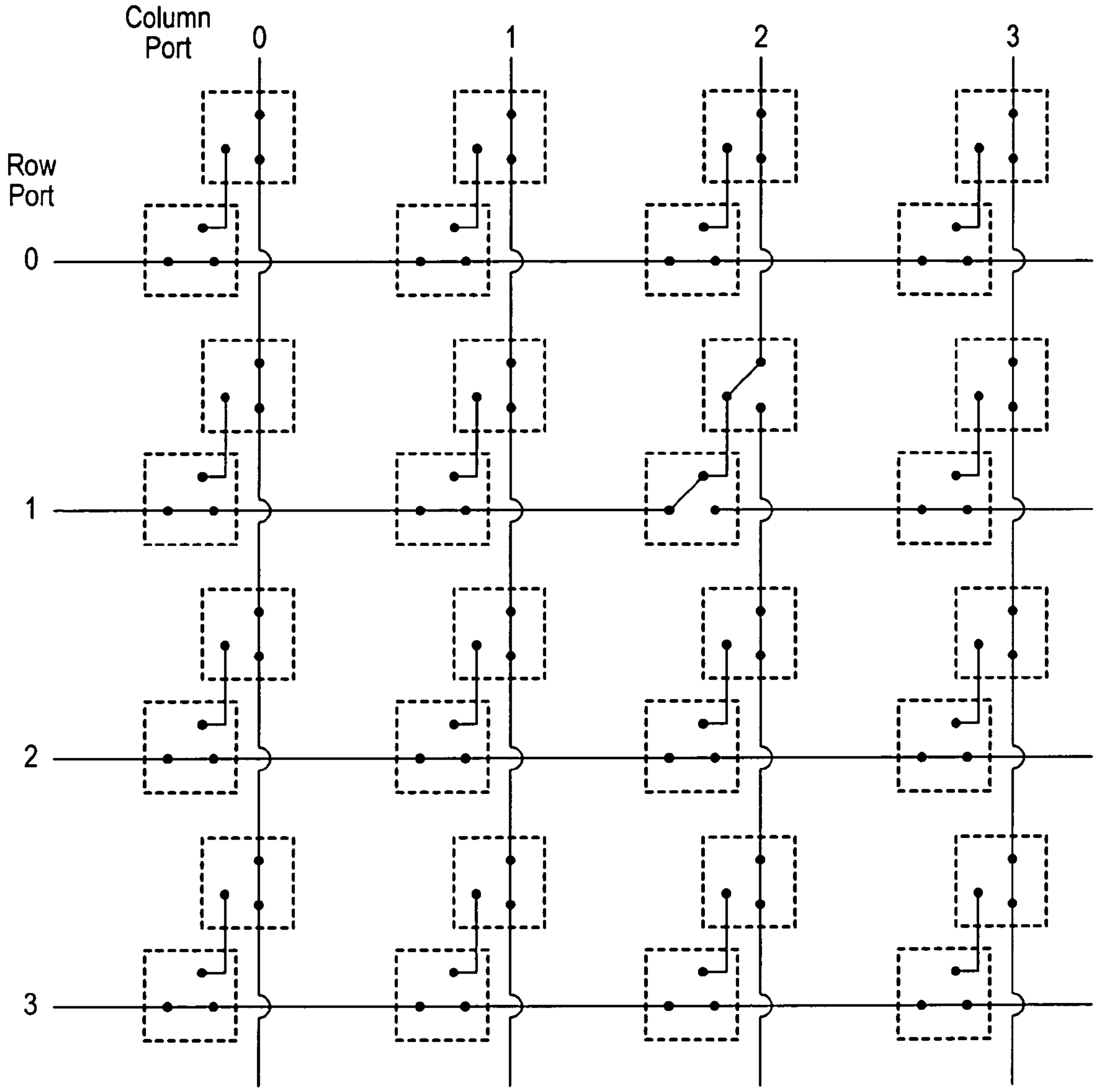
FIG. 3 illustrates a traditional full blocking matrix with two single pole, double throw switches at each crosspoint of the matrix, according to the prior art.
Figure 4:
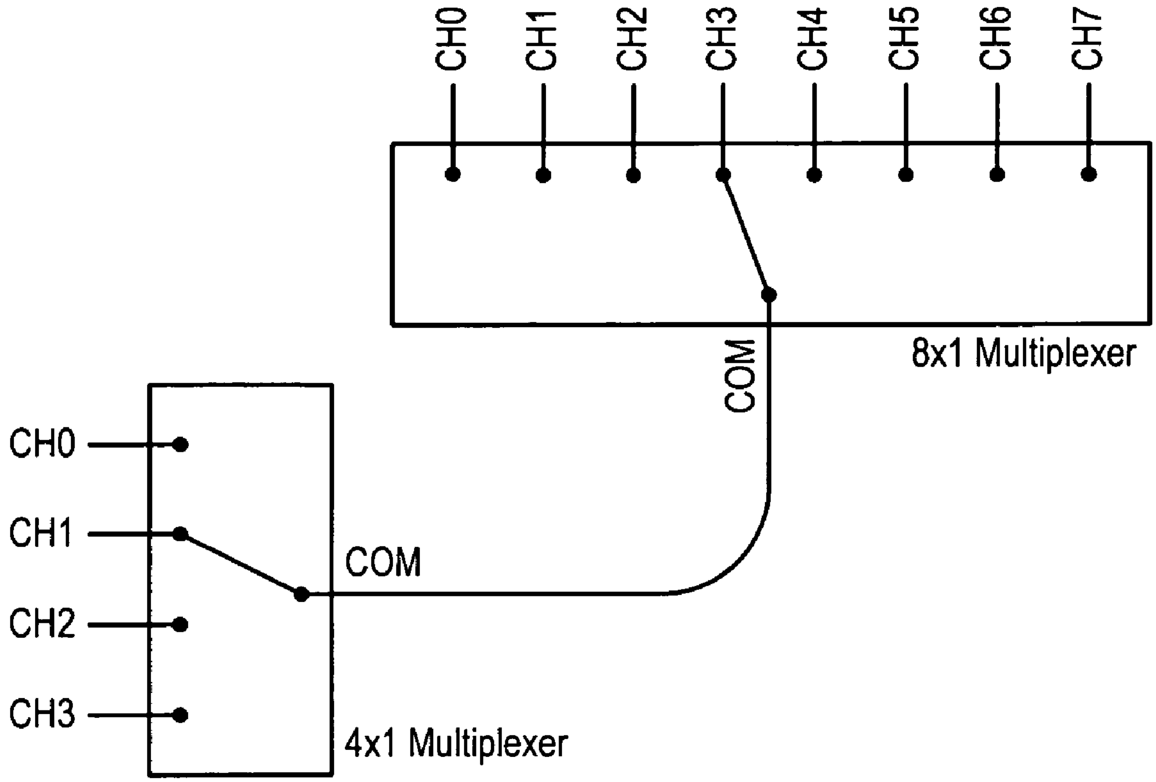
FIG. 4 illustrates one embodiment of a sparse matrix, according to the prior art.

In one embodiment, two of the switchable states (T1 and T3 connected, or T2 and T3 connected) have a signal stub with a length less than the approximate separation distance between two switches. However, this stub length may compare favorably to the unused (hanging) portions of conductors in a traditional switch matrix as shown in FIGS. 1 and 2. These two switchable states of the universal switch 100 may thus be appropriate for applications with high frequency signals greater than approximately 500 mega-hertz. The universal switch 100 is preferably substantially symmetric in loss and reflections from T1 to T3 and from T2 to T3. One of the switchable states of the two-switch embodiment (T1 and T2 connected) has negligible Signal stubs. However, in this state (T1 and T2 connected), the signal path between T1 and T2 includes the impedance of two switches.

In general, the package size of the switches or relays selected determines the minimum achievable stub size, and thus the maximum frequency before the first resonance from reflections. A single universal switch made with $4^{th}$ generation electromechanical signal relays such as Aromat GQ, Omron G6K, Axicom IM, or Fujitsu FTR may operate as high as approximately 2.5 GHz before encountering the first external stub resonance. Other smaller relays and switches are possible and contemplated and may be useale in creating an even higher frequency version of the universal switch 100.

Three Interconnected Switches

Figure 6:
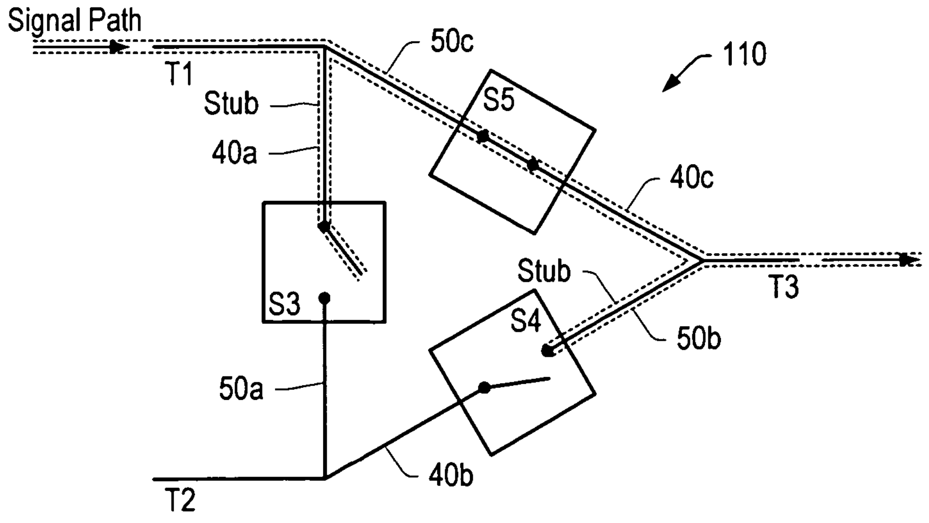
FIG. 6 illustrates one embodiment of a three terminal universal switch comprising 3 interconnected switches.

FIG. 6 illustrates an embodiment of a three terminal universal switch 110 comprising three interconnected switches S3, S4, and S5, and also indicates the signal path and Signal stubs for one of the possible interconnection configurations. In the embodiment shown, each of the interconnected switches comprises a first pin 40 and a second pin 50.

As FIG. 6 shows, the first pin 40*a* of the first switch S3 and the second pin 50*c* of the third switch S5 are both connected to the first terminal T1, the second pin 50*a* of the first switch S3 and the first pin 40*b* of the second switch S4 are both connected to the second terminal T2, and the second pin 50*b* of the second switch S4 and the first pin 40*c* of the third switch S5 are both connected to the third terminal T3.

Each switchable state that connects any pair of terminals of this three-switch embodiment has two Signal stubs. Each stub has a length approximately equivalent to the separation distance between switches. However, this stub length should compare favorably to the unused (hanging) portions of conductors in a traditional switch matrix as shown in FIGS. 1 and 2. All switchable states connecting any pair of terminals of the universal switch 110 may be appropriate for applications with high frequency signals up to approximately 500 mega-hertz, dependent on relay selection and placement.

Figure 7:
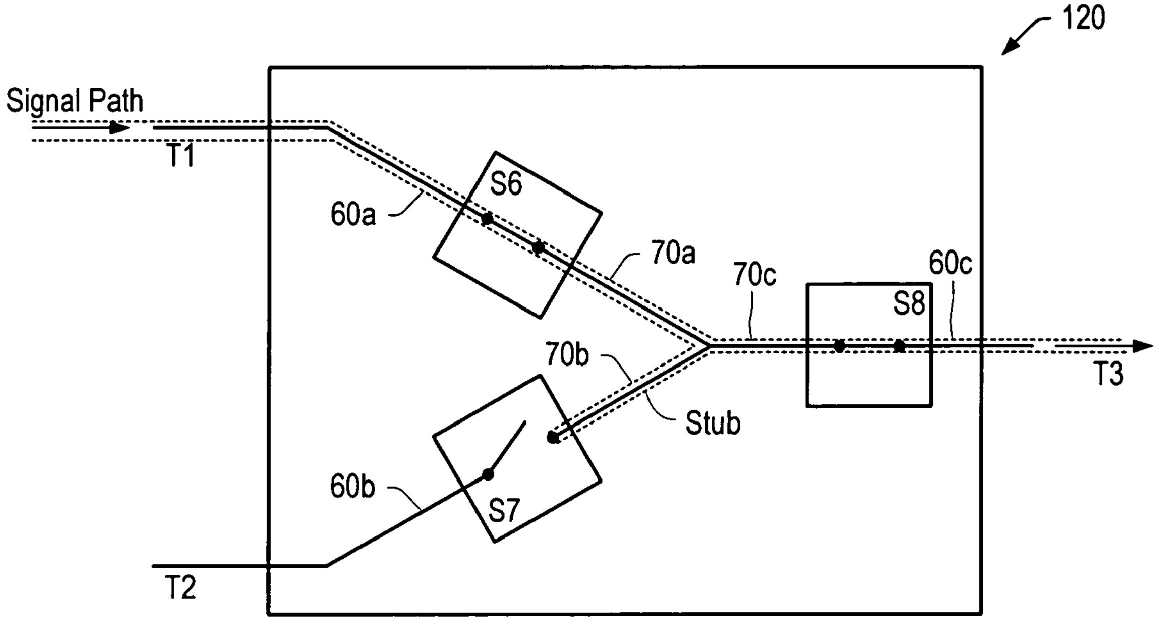
FIG. 7 illustrates another embodiment of a three terminal universal switch comprising 3 interconnected switches.

FIG. 7 illustrates an embodiment of a three terminal universal switch 120 comprising three interconnected switches S6, S7, and S8, and also indicates the signal path and Signal stubs for one of the possible interconnection configurations. Each of the interconnected switches comprises a first pin 60 and a second pin 70.

As shown in FIG. 7, the first pin 60*a* of the first switch S6 is connected to the first terminal T1, the first pin 60*b* of the second switch S7 is connected to the second terminal T2, the first pin 60*c* of the third switch S8 is connected to the third terminal T3, and the second pin 70 of each switch are connected together.

Each of the three interconnected switches may be independently switchable to implement the first pin 60 connected to the second pin 70 or the first pin 60 disconnected from the second pin 70. The first switch S6, the second switch S7, and the third switch S8 are independently switchable and may also disconnect the first terminal T1, the second terminal T2, and the third terminal T3 from each other.

As may be seen, the three switchable states with two of the three terminals connected have only one Signal stub. Each stub has a length approximately equivalent to the separation distance between switches. However, this stub length should compare favorably to the unused (hanging) portions of conductors in a traditional switch matrix as shown in FIGS. 1 and 2. One drawback of this embodiment is the impedance of two switches in each signal path.

Four Interconnected Switches

Figure 8:
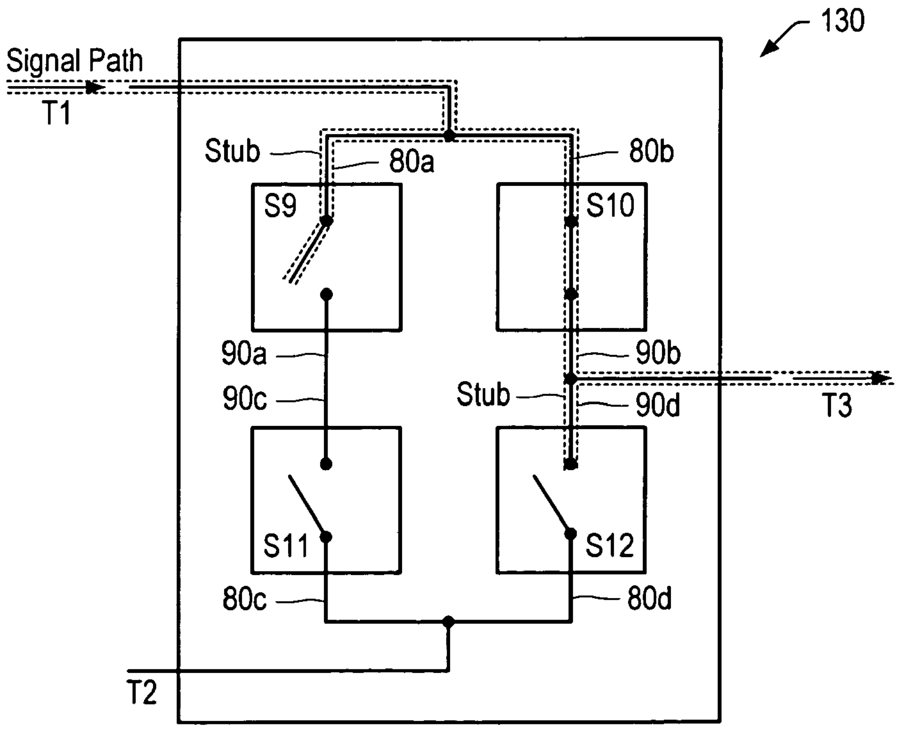
FIG. 8 illustrates one embodiment of a three terminal universal switch comprising 4 interconnected switches.

FIG. 8 illustrates an embodiment of a three terminal universal switch 130 comprising four interconnected switches S9, S10, S11, and S12, and also indicates the signal path and Signal stubs for one of the possible interconnection configurations. Each of the interconnected switches comprises a first pin 80 and a second pin 90.

As shown in FIG. 8, the first pin 80*a* of the first switch S9 and the first pin 80*b* of the second switch S10 are connected to the first terminal T1, the first pin 80*c* of the third switch S11 and the first pin 80*d* of the fourth switch S12 are connected to the second terminal T2, the second pin 90*a* of the first switch S9 is connected to the second pin 90*c* of the third switch S11, and the second pin 90*b* of the second switch S10 and the second pin 90*d* of the fourth switch S12 are connected to the third terminal T3.

Each of the four interconnected switches may be independently switchable to implement the first pin 80 connected to the second pin 90 or the first pin 80 disconnected from the second pin 90. The first switch S1, the second switch S2, the third switch S3, and the fourth switch S4 are independently switchable and may also disconnect the first terminal T1, the second terminal T2, and the third terminal T3 from each other.

Each of the switchable states of the universal switch 130 has two Signal stubs. Each stub has a length approximately equivalent to the separation distance between switches. However, this stub length should compare favorably to the unused (hanging) portions of conductors in a traditional switch matrix as shown in FIGS. 1 and 2. One drawback of this embodiment is the impedance of two switches in the signal path between terminals T1 and T2 only. Another drawback may be the added complexity of controlling four independent switches.

Dimensionally Flexible Sparse Matrix Topology

The various universal switches described above may be used to implement a variety of dimensionally flexible sparse switch matrices, some of which are described below.

Various embodiments of a dimensionally flexible sparse switch matrix comprising a plurality of ports connected to a plurality of interconnected universal switches are illustrated in FIGS. 9*a*, 9*b*, 10*a*, 10*b*, and 11. One or more of the plurality of ports may be common ports. The plurality of interconnected universal switches may be independently switchable to connect any first subset of ports of the sparse matrix to any second subset of the remaining ports of the plurality of ports.

Each of the universal switches comprises at least three terminals and a plurality of interconnected switches, coupled to the terminals. The plurality of interconnected switches may be independently switchable to connect any pair of the terminals, connect any one or more of the terminals to any subset of the other terminals, connect all terminals, or disconnect all terminals.

The dimensionally flexible sparse switch matrix may also be configurable to duplicate the connectivity of a variety of dimensionally different switch matrices by designating a first subset of the multiple ports as row ports and a second subset of the remaining ports as column ports. The dimensionally flexible sparse switch matrix preferably has the additional flexibility to connect ports row-to-row without connecting to a column, or column-to-column without connecting to a row, or both row-to-row and column-to-column.

A small physical size of Signal stubs in the switch matrix and within the universal switches may result in a signal path between any pair of terminals that may be suitable for the transmission of RF frequencies greater than approximately 500 mega-hertz. Each signal path from a respective one of the common ports to each port of a corresponding subset of specific ports may have approximately equivalent electrical length and impedance.

Figure 9A:
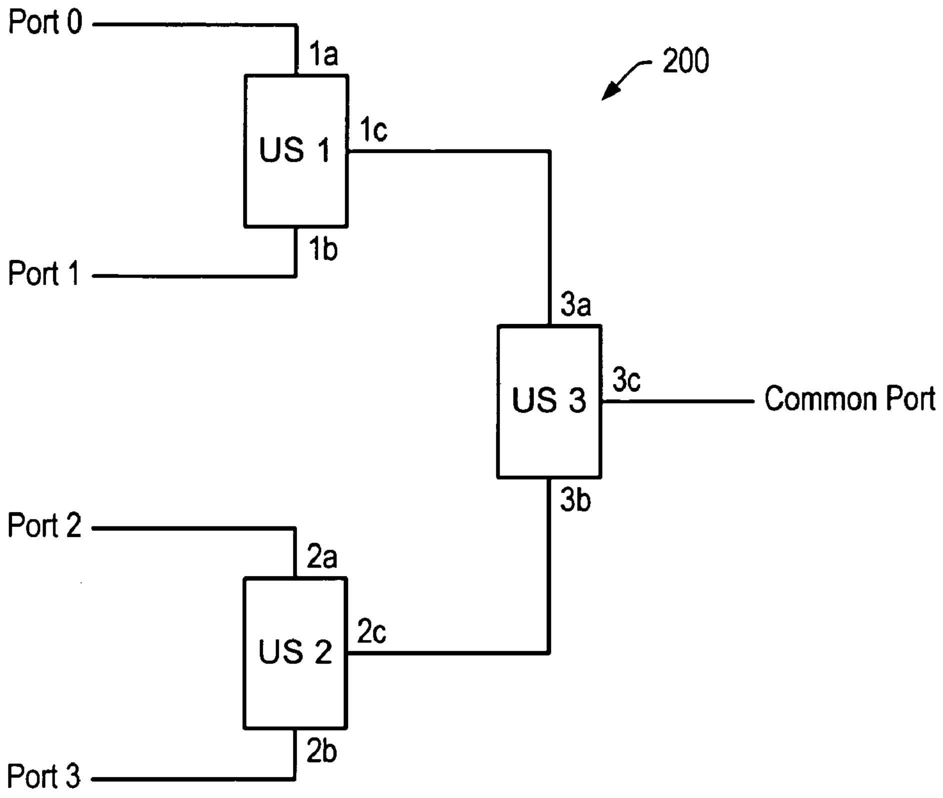
FIG. 9*a* is a high level block diagram of a sparse matrix comprising 3 universal switches, according to some embodiments.

Sparse Matrix Utilizing a Sparse Matrix Module Comprising Three Universal Switches FIG. 9*a* is a high level block diagram of a sparse matrix 200 comprising a sparse matrix module, four ports, and a common port, according to one embodiment. The sparse matrix module comprises three interconnected three-terminal universal switches: a first universal switch US1, a second universal switch US2, and a third universal switch US3. Each universal switch has a first terminal, a second terminal, and a third terminal. The third terminal 1*c* of US1 is connected to the first terminal 3*a* of US3 and the third terminal 2*c* of US2 is connected to the second terminal 3*b* of US3. Port 0 is connected to the first terminal 1*a* of US1 and port 1 is connected to the second terminal 1*b* of US1. Port 2 is connected to the first terminal 2*a* of US2 and port 3 is connected to the second terminal 2*b* of US2. A common port is connected to the third terminal 3*c* of US3.

The three interconnected three-terminal universal switches may be switchable to provide a signal path from any first subset of the ports to any second subset of the remaining ports. For example, port 0 may be connected to port 2, port 3, and the common port.

Figure 9B:
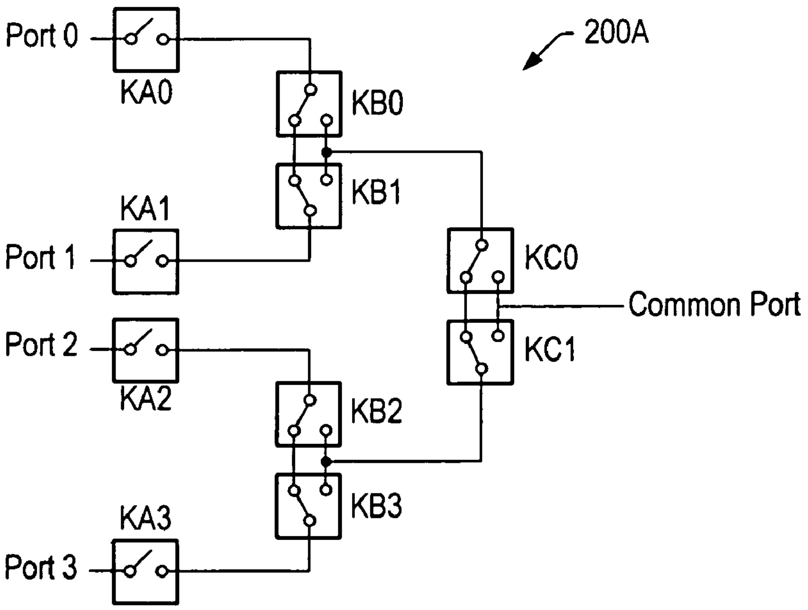
FIG. 9*b* illustrates one embodiment of a sparse matrix module comprising 3 universal switches, where each universal switch comprises 2 SPDT switches.

FIG. 9*b* illustrates an embodiment of the sparse matrix 200 of FIG. 9*a*. More specifically, FIG. 9*b* illustrates a sparse matrix 200A, where each universal switch comprises 2 SPDT switches: KB0 & KB1, KB2 & KB3, and KC0 & KC1. This embodiment also includes four disconnect switches KA0-KA3, where each disconnect switch is connected between a port and a corresponding terminal of a universal switch.

Each universal switch may be switchable to provide a radio frequency signal route from any one terminal to any other terminal of the universal switch. The three interconnected universal switches may be independently switchable to provide a radio frequency signal route from any one port to any other port of the sparse matrix switch. The radio frequency signal may have a frequency greater than approximately 500 mega-hertz.

A benefit of the topology of the embodiments of FIGS. 9*a* and 9*b* is the approximately equivalent electrical length and impedance of each signal path from the first common port to any of the other four ports.

Larger Sparse Matrices Comprising Multiple Sparse Matrix Modules

Figure 10A:
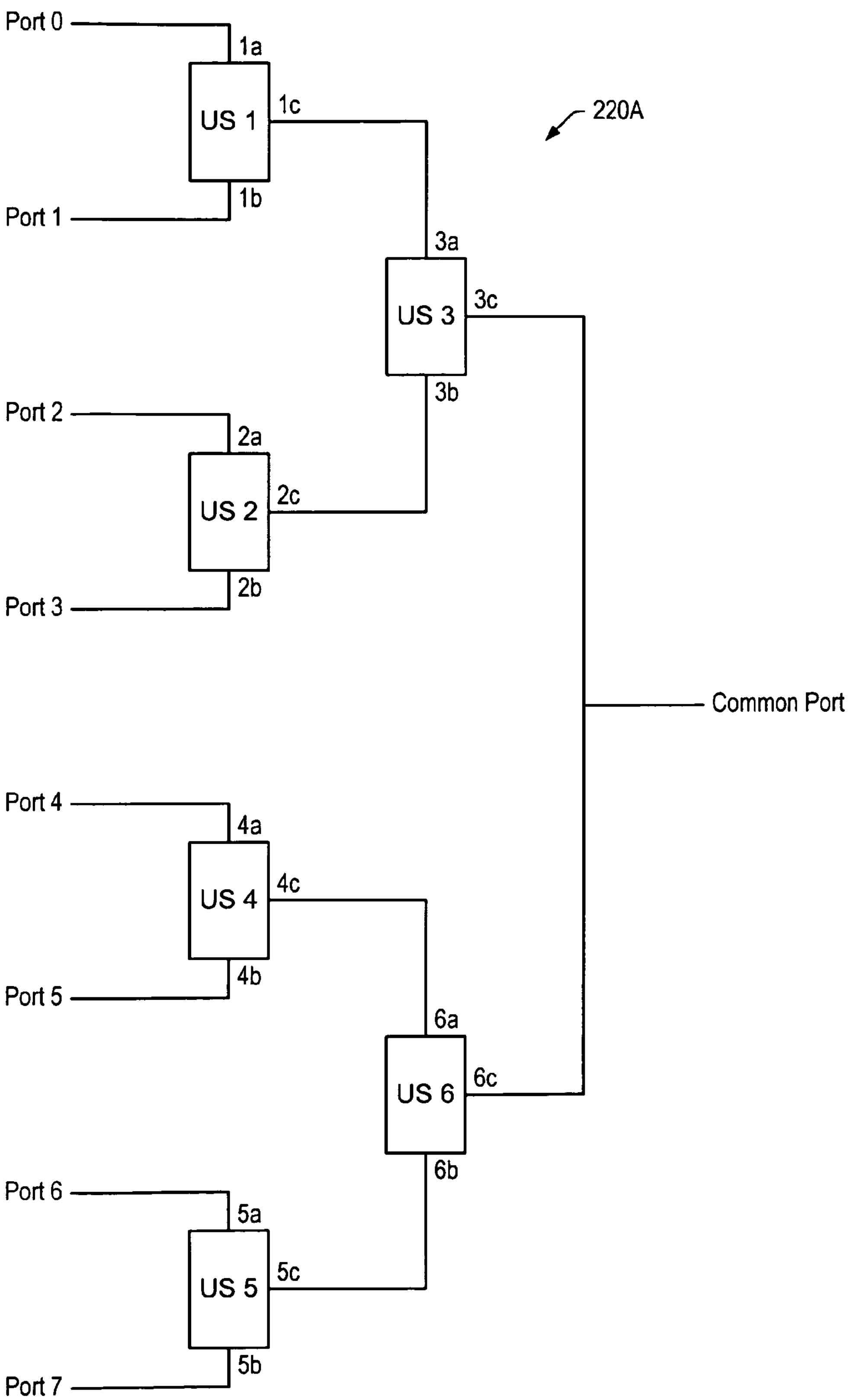
FIG. 10*a* illustrates one embodiment of a sparse matrix comprising 2 sparse matrix modules.
Figure 10B:
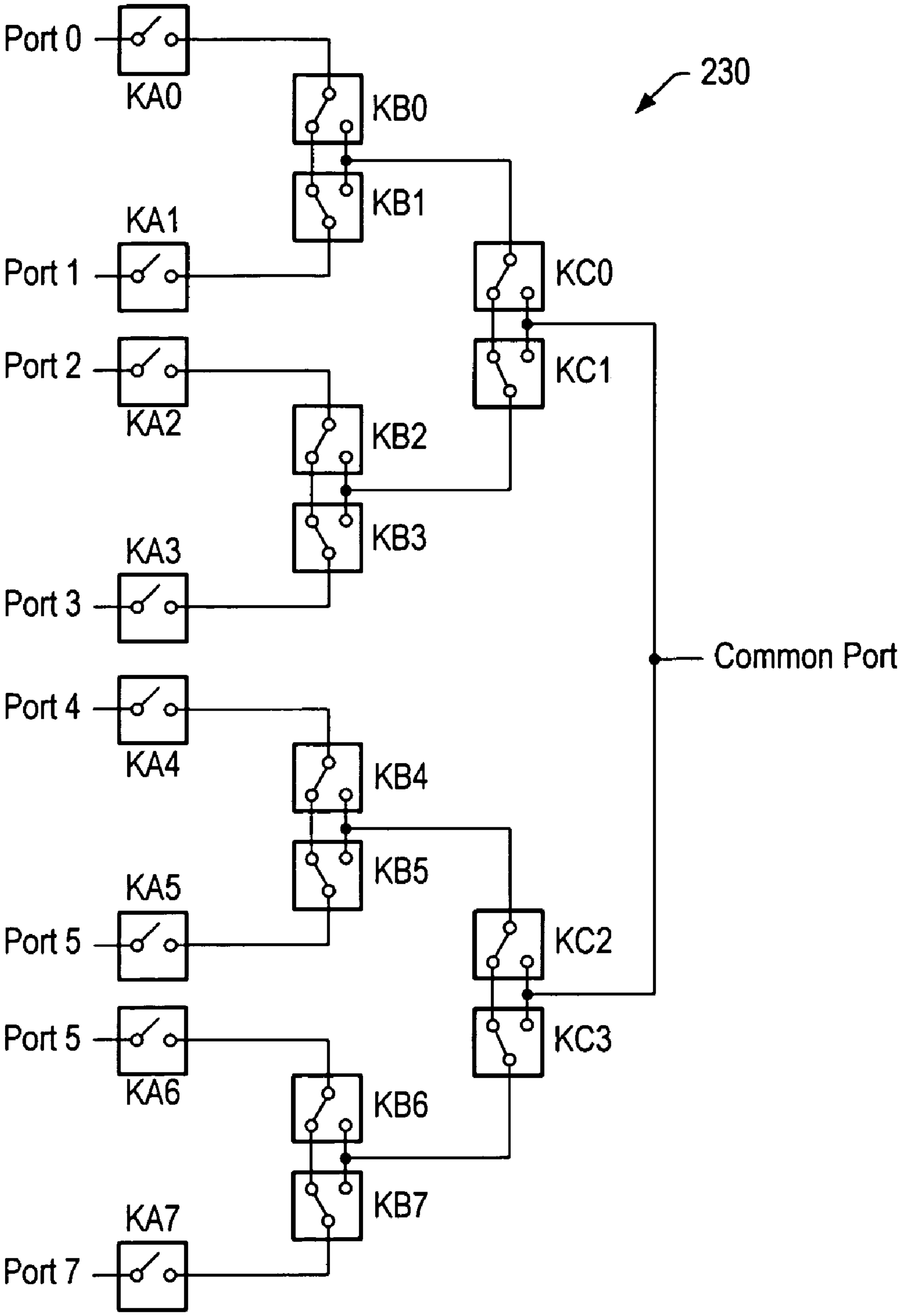
FIG. 10*b* illustrates one embodiment of a sparse matrix comprising 2 sparse matrix modules, where each universal switch comprises 2 SPDT switches.
Figure 11:
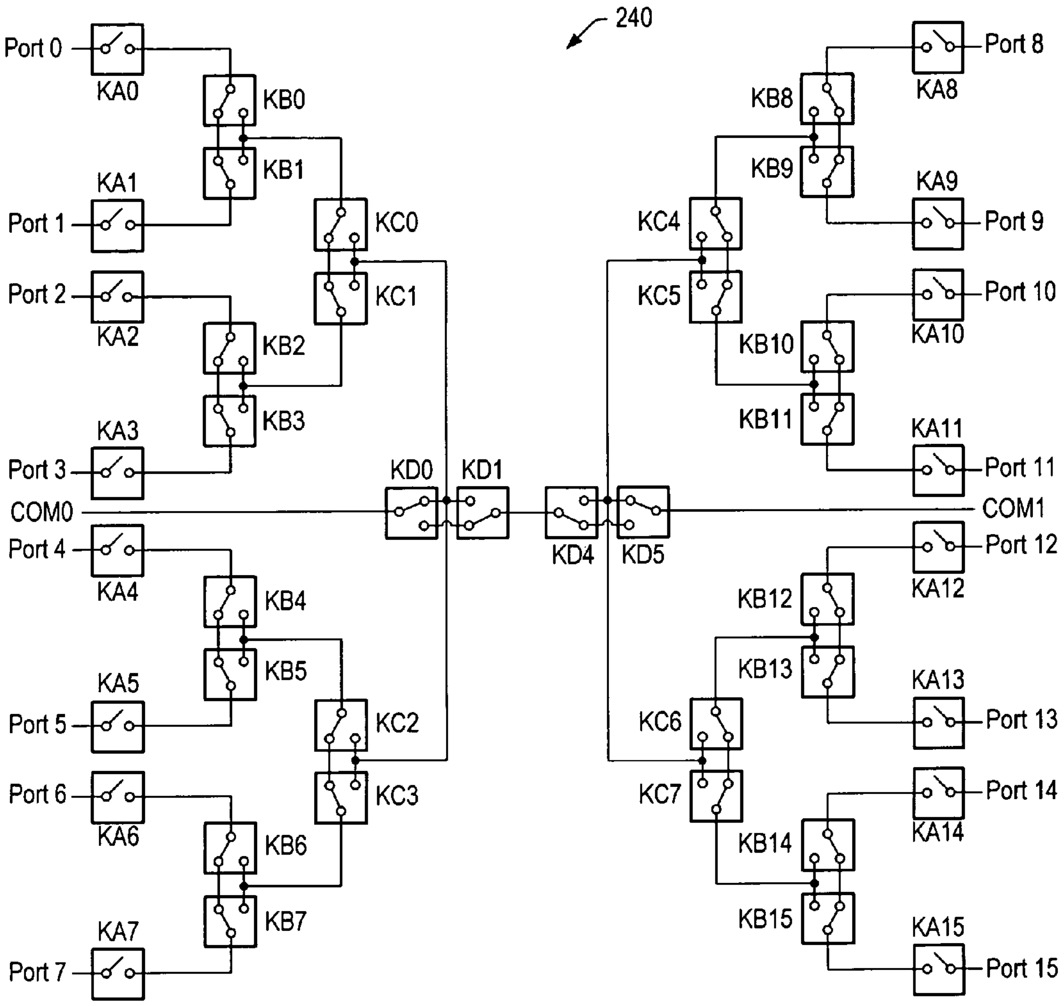
FIG. 11 illustrates one embodiment of a sparse matrix comprising 4 sparse matrix modules, where each universal switch comprises 2 SPDT switches.

FIGS. 10*a*, 10*b*, and 11 illustrate several exemplary larger sparse matrices created with multiple sparse matrix modules. It should be noted that the matrices shown are exemplary only, and that other matrices and topologies are also contemplated.

FIG. 10*a* provides a high level block diagram of one set of embodiments of a sparse matrix 220 comprising a first sparse matrix module, a second sparse matrix module, eight ports, and a common port. The first sparse matrix module comprises three interconnected three-terminal universal switches: a first universal switch US1, a second universal switch US2, and a third universal switch US3. The second sparse matrix module also comprises three interconnected three-terminal universal switches: a fourth universal switch US4, a fifth universal switch US5, and a sixth universal switch US6. Each universal switch has a first terminal, a second terminal, and a third terminal. The third terminal 4*c* of US4 is connected to the first terminal 6*a* of US6, and the third terminal 5*c* of US5 is connected to the second terminal 6*b* of US6. Port 4 is connected to the first terminal 4*a* of US4 and port 5 is connected to the second terminal 4*b* of US4. Port 6 is connected to the first terminal 5*a* of US5 and port 7 is connected to the second terminal 5*b* of US5. A first common port is connected in common to the third terminal 3*c* of US3 and the third terminal 6*c* of US6.

The two sets of three interconnected three-terminal universal switches may be independently switchable to provide a signal path from any first subset of the nine ports to any second subset of the remaining ports.

FIG. 10*b* illustrates one embodiment of a sparse matrix 220A that is one embodiment of sparse matrix 220, where each universal switch comprises 2 SPDT switches: KB0-7 and KC0-3. This embodiment also includes eight disconnect switches KA0-7, where each disconnect switch is connected between a port and a corresponding terminal of a universal switch.

FIG. 11 illustrates another embodiment of a sparse matrix 240 that comprises four sparse matrix modules, 16 ports 0-15, 2 common ports COM0 and COM1, and a set of two additional universal switches. The two additional universal switches each comprising two SPDT switches: KD0-1 and KD4-5 may be used to interconnect sparse matrix modules and the two common ports. The set of two additional universal switches is preferably switchable to connect either common port to any subset of the other ports, to disconnect either common port from the other ports of the sparse matrix, or to disconnect one common port from the other. The later feature may be utilized when switching the sparse matrix from one configuration to another, for example, to avoid shorting two common ports.

FIG. 11 also illustrates the utilization of disconnect switches, where each disconnect switch is connected between a port and a corresponding terminal of a universal switch to ensure the absence of signals when switching the universal switches.

As may be seen, due to the symmetric topology of these sparse matrices the signal path from any one of the common ports to each port of a selected subset of the ports has approximately equivalent electrical length and impedance. A selected subset of the ports may be any set of ports that are connected to any one sparse matrix module.

In a preferred embodiment, the universal switches may also be switchable to implement any of a variety of dimensionally different switch matrices. Consequently, any of the sparse matrices described above may be dimensionally flexible, where a first subset of the plurality of ports may be specified as row ports and a second subset of the remaining ports of the plurality of ports may be specified as column ports. In addition, in some embodiments, the plurality of interconnected universal switches may be switchable to connect ports row-to-row without connecting to a column, column-to-column without connecting to a row, or both row-to-row and column-to-column.

In some embodiments, the sparse matrix may also include a controller operable to set the internal connection state of each universal switch and each disconnect switch, if applicable, such that the first and second subsets of the plurality of ports may be connected.

Another benefit of the sparse matrix switch topology detailed herein, may be provided by the plurality of universal switches that are independently switchable to subdivide the sparse matrix into independent portions. In this configuration, each independent portion of the sparse matrix may transmit an independent signal.

Still another benefit of the sparse matrix switch may be the option of terminating selected ports. The plurality of universal switches may be switchable to not only route a signal through the switch, but to also connect the signal to an externally terminated port.

Additional sparse matrix modules may be added to the sparse matrix switches described above to achieve even larger sparse matrices. Any and all of combinations of the above described switch matrix modules are considered to be within the scope of the present invention.

Numerous variations and modifications will become apparent to those skilled in the art once the above disclosure is fully appreciated. It is intended that the following claims be interpreted to embrace all such variations and modifications.

What is claimed is:

1. A three terminal universal switch, comprising:

a first terminal, a second terminal, and a third terminal; and a plurality of directly interconnected switches, coupled to the terminals, wherein each switch is independently switchable; and wherein the plurality of directly interconnected switches are configurable to implement:

the first terminal connected only to the second terminal;

the first terminal connected only to the third terminal;

the second terminal connected only to the third terminal; or the first terminal connected to the second terminal and the third terminal.

2. The universal switch of claim 1, wherein at least one of the plurality of interconnected switches is a relay.

3. The universal switch of claim 1, wherein at least one of the plurality of interconnected switches is an electro-mechanical switch.

4. The universal switch of claim 1, wherein at least one of the plurality of interconnected switches is a mechanical switch.

5. The universal switch of claim 1, wherein at least one of the plurality of interconnected switches is a solid state switch.

6. The universal switch of claim 1, wherein the plurality of interconnected switches comprises a first switch and a second switch;

wherein each switch comprises a first pin, a second pin, and a third pin;

wherein each switch is independently switchable to implement the first pin connected to the second pin or the first pin connected to the third pin; and wherein the first pin of the first switch is connected to the first terminal, the first pin of the second switch is connected to the second terminal, the second pin of the first switch is connected to the second pin of the second switch, and the third pin of the first switch is commonly connected to the third pin of the second switch and the third terminal.

7. The universal switch of claim 6, wherein each switch is further switchable to disconnect the first pin from both the second pin and the third pin, and wherein the first switch and the second switch are independently switchable to implement the first terminal, second terminal, and third terminal disconnected from each other.

8. The universal switch of claim 6, wherein the first switch and the second switch are single pole, double throw relays.

9. The universal switch of claim 8, wherein each relay comprises a respective coil coupled to a corresponding pair of external coil terminals, and wherein each relay is switchable via an electric current applied to the corresponding coil terminals.

10. The universal switch of claim 1, wherein the plurality of interconnected switches comprises a first switch, a second switch, and a third switch, wherein each switch comprises a first pin and a second pin, and wherein each switch is independently switchable to implement the first pin connected to the second pin or the first pin disconnected from the second pin;

wherein the first pin of the first switch and the second pin of the third switch are both connected to the first terminal, the second pin of the first switch and the first pin of the second switch are both connected to the second terminal, the second pin of the second switch and the first pin of the third switch are both connected to the third terminal; and wherein the first switch, the second switch, and the third switch are independently switchable to further implement the first terminal, second terminal, and third terminal disconnected from each other.

11. The universal switch of claim 10, wherein the first switch, second switch, and third switch are single pole, single throw relays.

12. The universal switch of claim 11, wherein each relay comprises a respective coil coupled to a corresponding pair of external coil terminals, and wherein each relay is switchable via an electric current applied to the corresponding coil terminals.

13. The universal switch of claim 1, wherein the plurality of interconnected switches comprises a first switch, a second switch, and a third switch, wherein each switch comprises a first pin and a second pin, and wherein each switch is independently switchable to implement the first pin connected to the second pin or the first pin disconnected from the second pin;

wherein the first pin of the first switch is connected to the first terminal, the first pin of the second switch is connected to the second terminal, and the first pin of the third switch is connected to the third terminal, and the second pin of each switch is connected together; and wherein the first switch, the second switch, and the third switch are independently switchable to further implement the first terminal, second terminal, and third terminal disconnected from each other.

14. The universal switch of claim 13, wherein the first switch, second switch, and third switch are single pole, single throw relays.

15. The universal switch of claim 14, wherein each relay comprises a respective coil coupled to a corresponding pair of external coil terminals, and wherein each relay is switchable via an electric current applied to the corresponding coil terminals.

16. The universal switch of claim 1, wherein the plurality of interconnected switches comprises a first switch, a second switch, a third switch, and a fourth switch, wherein each switch comprises a first pin and a second pin, and wherein each switch is independently switchable to implement the first pin connected to the second pin or the first pin disconnected from the second pin;

wherein the first pin of the first switch and the first pin of the second switch are connected to the first terminal, the first pin of the third switch and the first pin of the fourth switch are connected to the second terminal, the second pin of the first switch is connected to the second pin of the third switch, and the second pin of the second switch and the second pin of the fourth switch are connected to the third terminal; and wherein the first switch, the second switch, the third switch, and the fourth switch are independently switchable to further implement the first terminal, second terminal, and third terminal disconnected from each other.

17. The universal switch of claim 16, wherein the four switches are single pole, single throw relays.

18. The universal switch of claim 17, wherein each relay comprises a respective coil coupled to a corresponding pair of external coil terminals, and wherein each relay is switchable via an electric current applied to the corresponding coil terminals.

19. A three terminal universal switch, comprising: a first terminal, a second terminal, and a third terminal; and a plurality of interconnected switches, coupled to the terminals, wherein each switch is independently switchable; wherein the plurality of directly interconnected switches are configurable to implement: the first terminal connected only to the second terminal; the first terminal connected only to the third terminal; the second terminal connected only to the third terminal; the first terminal connected to the second terminal and the third terminal; or the first terminal, second terminal, and third terminal disconnected from each other.

20. A three terminal universal switch, comprising: a first terminal, a second terminal, and a third terminal; and a plurality of directly interconnected switches, coupled to the terminals, wherein each switch is independently switchable; wherein the plurality of interconnected switches comprises a first switch and a second switch; wherein each switch comprises a first pin, a second pin, and a third pin; wherein each switch is independently switchable to implement the first pin connected to the second pin or the first pin connected to the third pin; wherein the first pin of the first switch is connected to the first terminal, the first pin of the second switch is connected to the second terminal, the second pin of the first switch is connected to the second pin of the second switch, and the third pin of the first switch is commonly connected to the third pin of the second switch and the third terminal; and wherein the plurality of interconnected switches are configurable to implement: the first terminal connected only to the second terminal; the first terminal connected only to the third terminal; or the second terminal connected only to the third terminal.

21. A three terminal universal switch, comprising: a first terminal, a second terminal, and a third terminal; and a plurality of directly interconnected switches, coupled to the terminals; wherein each switch is independently switchable; wherein the plurality of interconnected switches comprises a first switch and a second switch; wherein each switch comprises a first pin, a second pin, and a third pin; wherein each switch is independently switchable to implement the first pin connected to the second pin or the first pin connected to the third pin; wherein the first pin of the first switch is connected to the first terminal, the first pin of the second switch is connected to the second terminal, the second pin of the first switch is connected to the second pin of the second switch, and the third pin of the first switch is commonly connected to the third pin of the second switch and the third terminal; and wherein the plurality of interconnected switches are configurable to implement: the first terminal connected only to the second terminal; the first terminal connected only to the third terminal; the second terminal connected only to the third terminal; or the first terminal connected to the second terminal and the third terminal.

22. A three terminal universal switch, comprising:

a set of terminals comprising a first terminal, a second terminal, and a third terminal; and a plurality of directly interconnected switches, coupled to the terminals, wherein each switch is independently switchable; and wherein the plurality of directly interconnected switches are switchable to connect any sub-set of two or more of the set of terminals.

23. A three terminal universal switch, comprising:

a first terminal, a second terminal, and a third terminal; and a pair of interconnected switches, coupled to the terminals, wherein each switch is independently switchable; and wherein the pair of interconnected switches are configurable to implement:

the first terminal connected only to the second terminal;

the first terminal connected only to the third terminal;

the second terminal connected only to the third terminal; or the first terminal connected to the second terminal and the third terminal.

24. The universal switch of claim 23, wherein each switch comprises a first pin, a second pin, and a third pin;

wherein each switch is independently switchable to implement the first pin connected to the second pin or the first pin connected to the third pin; and wherein the first pin of the first switch is connected to the first terminal, the first pin of the second switch is connected to the second terminal, the second pin of the first switch is connected to the second pin of the second switch, and the third pin of the first switch is commonly connected to the third pin of the second switch and the third terminal.

* * * * *